(12) United States Patent
Hart et al.

(10) Patent No.: US 8,186,074 B2
(45) Date of Patent: May 29, 2012

(54) FLUID LEVEL GAUGE HAVING SWIVEL BLADE

(75) Inventors: Larry Hart, Metamora, IL (US); Robert John Chesney, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 569 days.

(21) Appl. No.: 11/892,360

(22) Filed: Aug. 22, 2007

(65) Prior Publication Data
US 2009/0049706 A1 Feb. 26, 2009

(51) Int. Cl.
*G01F 23/04* (2006.01)
(52) U.S. Cl. ................ 33/731; 33/722; 33/730
(58) Field of Classification Search .............. 33/722, 33/728, 730, 731; 73/290 R, 298, 299
See application file for complete search history.

(56) References Cited

U.S. PATENT DOCUMENTS

| | | | |
|---|---|---|---|
| 3,722,102 A | 3/1973 | Jackson et al. | |
| 4,368,579 A | 1/1983 | Bauer | |
| 4,640,126 A | 2/1987 | Jänsch | |
| 4,651,428 A | 3/1987 | Allaria et al. | |
| 4,761,886 A | 8/1988 | Wilson et al. | |
| 4,786,887 A | 11/1988 | Bringmann et al. | |
| 4,941,268 A | 7/1990 | Tausk | |
| 5,022,495 A | 6/1991 | Lavender | |
| 5,099,584 A | 3/1992 | Williams | |
| 5,113,594 A | 5/1992 | Ishihara et al. | |
| 5,485,681 A | 1/1996 | Hitchcock | |
| 5,613,303 A | 3/1997 | Kayano et al. | |
| 5,829,153 A * | 11/1998 | Hitchock | 33/728 |
| 6,298,721 B1 | 10/2001 | Schuppe et al. | |
| 6,314,808 B1 | 11/2001 | Williams et al. | |
| 6,453,740 B1 | 9/2002 | Williams et al. | |
| 6,935,044 B2 | 8/2005 | Dougherty et al. | |
| 6,988,403 B2 | 1/2006 | Dougherty et al. | |
| 7,055,384 B2 | 6/2006 | Williams et al. | |
| 7,131,213 B2 * | 11/2006 | Dougherty et al. | 33/722 |
| 7,134,220 B2 * | 11/2006 | Porter et al. | 33/722 |
| 2003/0061875 A1 * | 4/2003 | Dougherty et al. | 73/290 R |
| 2003/0150125 A1 | 8/2003 | Dougherty et al. | |
| 2004/0065291 A1 | 4/2004 | Callini et al. | |
| 2004/0143985 A1 | 7/2004 | Porter et al. | |

* cited by examiner

*Primary Examiner* — Yaritza Guadalupe-McCall
(74) *Attorney, Agent, or Firm* — Finnegan, Henderson, Farabow, Garrett & Dunner LLP

(57) ABSTRACT

A fluid level gauge for use with an engine is provided. The fluid level gauge may have a blade, a handle having a protrusion, and a swivel rigidly connected to the blade and having a recess to receive the protrusion. The fluid level gauge may also have a retention member configured to inhibit the protrusion from exiting the recess. The swivel can rotate independent of the handle when the fluid level gauge is fully assembled.

17 Claims, 2 Drawing Sheets

FLUID LEVEL GAUGE HAVING SWIVEL BLADE

TECHNICAL FIELD

The present disclosure relates generally to a fluid level gauge, and more particularly, to a fluid level gauge having a blade that swivels independent of an associated handle.

BACKGROUND

Machines such as, for example, internal combustion engines, transmissions, and hydraulic tools often have fluid systems associated therewith. These fluid systems can include, among others, a lubrication system, a working fluid system, a cooling system, and a fueling system. The fluid levels of each of these systems may require period inspection and replenishment. One way to inspect the fluid level is through the use of a fluid level gauge, also known as a dipstick. The dipstick typically includes a blade portion that extends though a tubular guide into a fluid reservoir and includes markings thereon indicative of an amount of fluid within the reservoir. A handle is attached to the blade portion and seals against the tubular guide by way of threads and a compressible member such as an o-ring.

Although this type of fluid level gauge may be adequate for some systems, it can also be problematic. Specifically, if the tubular guide includes bends, the blade portion may bind against the tubular guide at the bends. This binding tends to resist rotation of the handle and, in some situations, can cause the blade to twist during engagement of the handle with the tubular guide. During subsequent operation, the twisted blade portion acts like a spring having stored energy, the stored energy working to disengage the handle from the tubular guide. If the handle disengages from the tubular guide, it may be possible for gases and/or fluid to pass to the atmosphere.

One system focused on reducing the likelihood of handle/guide disengagement is described in U.S. Pat. No. 5,485,681 (the '681 patent) issued to Hitchcock on Jan. 23, 1996. The '681 patent describes a swivel type dipstick with a screw-on cap. The swiveling motion allows the blade of the dipstick to rotate freely, thus allowing the dipstick to be used with non-linear fill tubes. The screw-on cap provides a tight seal between the dipstick and the fill tube, thereby preventing fluid leakage.

The blade of the dipstick of the '681 patent is connected to the cap by way of a swivel. Specifically, the blade is rigidly connected to the swivel by a dowel, the swivel then being connected at an opposite end to the cap by a cylinder having a two-tined fork. Each of the tines terminates in a triangular grip. The tines are made out of a material such as plastic that is suitably resilient so that the tines may be bent inwardly. In their normal position the distance between the further most tips of the triangular grips is larger than the interior diameter of the cap. However, when the tines are bent inwardly, the distance between the furthermost tips of the triangular grips is smaller than the interior diameter of the cap, thus allowing the tines to be inserted into the cap. When the tines are then released, they expand outwardly to their normal position and engage the interior surface of the cap, thus securing the dipstick blade to the cap. However, since the tines only slidingly engage the interior surface of the cap, the dipstick blade rotates freely (i.e., swivels) around its longitudinal axis.

Although the dipstick of the '681 patent may help reduce the likelihood of unintentional cap/guide disengagement, it may still be suboptimal. That is, because the connection between the blade and the cap relies on the bending of plastic tines, the dipstick may be insufficiently robust. For example, it may be possible for the tines to lose their resiliency with time and fail to expand and engage the cap sufficiently. This loss of resiliency could result in the blade becoming detached from the cap. In addition, with the loss of resiliency, the plastic tines may become brittle and break, again resulting in the detachment of the blade from the cap. It may also be possible for the blade to become detached from the swivel if the dowel were to become dislodged therefrom by, for example, engine vibrations or during servicing.

The disclosed fluid level gauge is directed to addressing one or more of the issues set forth above.

SUMMARY OF THE INVENTION

In one aspect, the present disclosure is directed to a fluid level gauge. The fluid level gauge may include a blade, a handle having a protrusion, and a swivel rigidly connected to the blade and having a recess to receive the protrusion. The fluid level gauge may also include a retention member configured to inhibit the protrusion from exiting the recess. The swivel can rotate independent of the handle when the fluid level gauge is fully assembled.

In another aspect, the present disclosure is directed to another fluid level gauge. This fluid level gauge may include a blade, and a swivel rigidly connected to the blade. The fluid level gauge may also include a handle, and a C-clip connecting the handle to the swivel.

DETAILED DESCRIPTION

Figure 1:
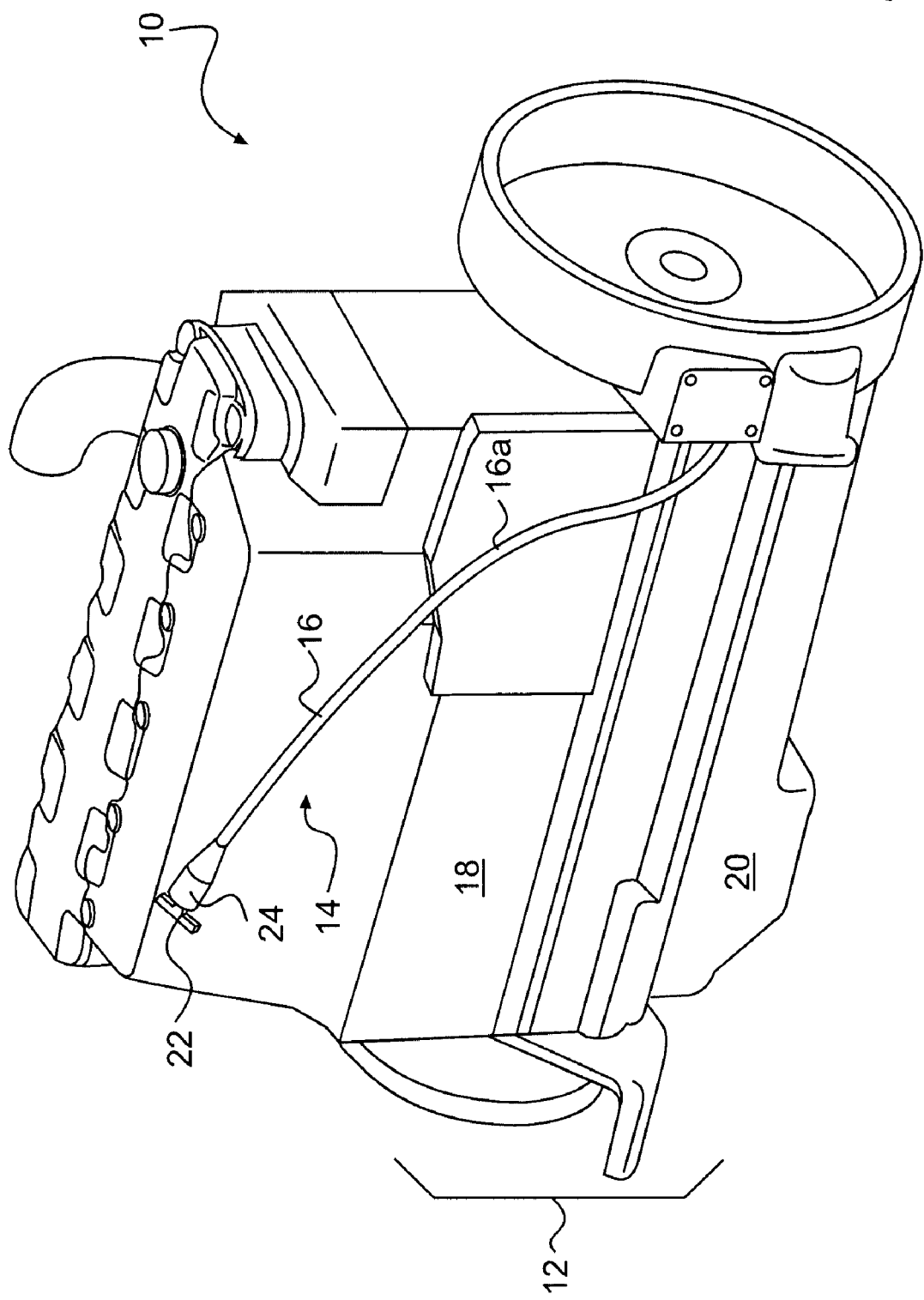
FIG. 1 is a pictorial illustration of an exemplary disclosed machine.

FIG. 1 illustrates a machine 10 having at least one fluid system 12. In the example of FIG. 1, machine 10 may embody an engine, and fluid system 12 may embody a lubrication circuit of the engine. It is contemplated however, that machine 10 may embody any other type of machine known in the art such as a transmission, a hydraulic tool, or another similar piece of equipment having an associated fluid system.

Fluid system 12 may require periodic inspection, including a visual observation of an amount of fluid present within machine 10. This visual observation may be achieved through the use of a fluid level gauge 14. Fluid level gauge 14 may include a guide tube 16 that may be mounted to one or both of an engine block 18 and an oil sump 20 of machine 10. Guide tube 16 may allow (i.e., guide) a dipstick 22 to enter engine block 18 and/or oil sump 20 and be at least partially immersed in (i.e., dipped into) the fluid contained therein. As illustrated in FIG. 1, guide tube 16 may include one or more bends 16a to avoid other components (not shown) of machine 10. An adapter 24 may help fluidly seal dipstick 22 to guide tube 16 to prevent gases and fluid from escaping machine 10 via fluid level gauge 14. In one example, adapter 24 may be fabricated from a plastic material and injection molded directly onto guide tube 16, which may be fabricated from a metal material.

Figure 2:
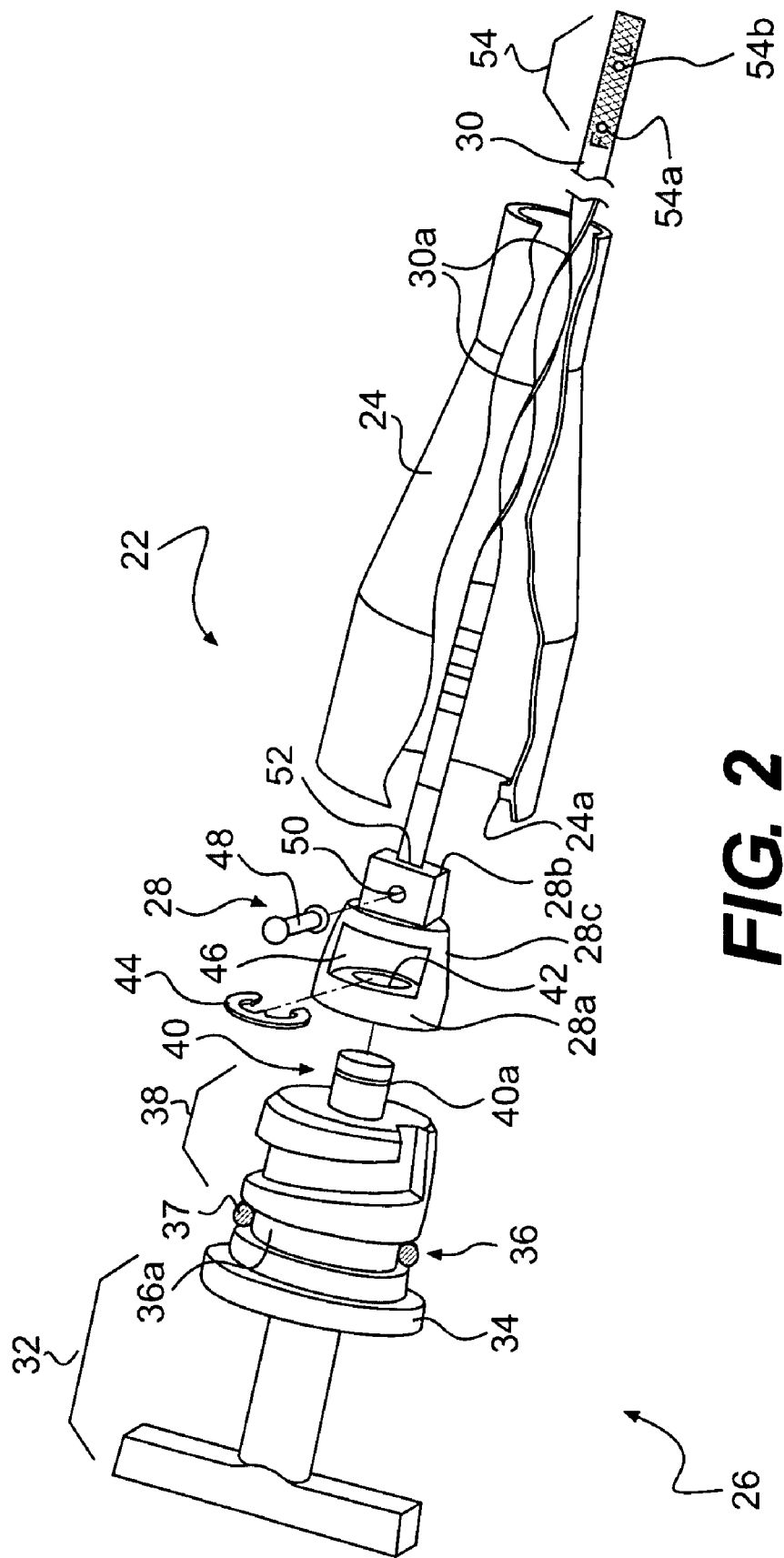
FIG. 2 is an exploded/cutaway view illustration of an exemplary disclosed fluid level gauge for use with the machine of FIG. 1.

As illustrated in FIG. 2, dipstick 22 may be an assembly of components. Specifically, dipstick 22 may include a handle 26, a swivel, 28, and a blade 30. Swivel 28 may connect blade 30 to handle 26 such that handle 26 can be rotated somewhat independently of blade 30. In this manner, minimal torque may be transmitted from handle 26 to blade 30 and vice versa.

Handle 26 may be injection molded from a plastic material to include a T-shaped portion 32, a flange portion 34, a sealing portion 36, a threaded portion 38, and a projecting portion 40. The T-shaped portion 32 may provide a gripping surface, allowing a service technician to exert a torque on handle 26 during the visual inspection of fluid system 12 (referring to FIG. 1). Flange portion 34 may be connected to the T-shaped portion 32 and act as an end stop, preventing handle 26 from being inserted too far into adapter 24. Sealing portion 36 may be connected to flange portion 34 and include a recess 36a configured to receive a separate sealing member 37 such as an o-ring disposed within recess 36a. When handle 26 is inserted into adapter 24, sealing member 37 may be sandwiched between an annular surface of recess 36a and an internal annular wall of adapter 24. Threaded portion 38 may be connected to sealing portion 36 and include a quarter turn spiraling groove (i.e., a groove spiraling through an angle of about 90 degrees) configured to receive a protrusion 24a of adapter 24 as handle 26 is rotated, thereby drawing flange portion 34 into engagement with an end of adapter 24 and retaining handle 26 in the engaged position. A taper 38a at an end of threaded portion 38 may facilitate the alignment of handle 26 with adapter 24 during the visual inspection (i.e., taper 38a may pilot handle 26 into adapter 24). Projecting portion 40 may include an annular groove 40a that facilitates connection of handle 26 to swivel 28.

Swivel 28 may be injection molded from a plastic material and include a first end 28a removably connected to handle 26. First end 28a may be generally cylindrical in shape and include a centrally located recess or bore 42 configured to receive projecting portion 40. An annular clearance may be maintained between projecting portion 40 and bore 42 such that handle 26 may freely rotate relative to swivel 28. A C-clip 44, having an outer diameter larger than a diameter of bore 42, may engage annular groove 40a to retain projecting portion 40 within bore 42. A window 46 within a side portion of swivel 28 may allow service access to C-clip 44.

Swivel 28 may also include a second end 28b located in opposition to first end 28a and rigidly connected to blade 30. Second end 28b may be generally cubical in shape and include a centrally located rectangular slot 52 that receives blade 30 in alignment with handle 26. A cylindrical fastener 48 may connect swivel 28 to blade 30 by passing through bores 50 in both swivel 28 and blade 30. In one example, cylindrical fastener 48 may embody a rivet having opposing heads with diameters larger than a diameter of the bores 50 in swivel 28 and blade 30 that receive the rivet. In this example, the enlarged heads may help prevent fastener 48 from exiting the bores 50. To properly seat the heads of fastener 48, external surfaces at second end 28b of swivel 28 may be generally planar and parallel to each other. A taper 28c between first and second ends 28a, b may facilitate the alignment of swivel 28 with adapter 24 during the visual inspection (i.e., taper 28c may pilot swivel 28 into adapter 24).

Blade 30 may be fabricated from a metallic material and have a generally rectangular cross-section. To increase a stiffness (i.e., a resistance to bending) of blade 30 in a thickness direction thereof, blade 30 may include a plurality of twists 30a along its length. At a distal end of blade 30, markings 54 may be provided as indicia with regard to the fluid level within machine 10. For example, a first marking 54a may be representative of a low level of fluid, below which additional fluid should be added to fluid system 12. In one embodiment, the letters "L" or "LOW" may be included in the first marking 54a. A second marking 54b may be spaced apart from first marking 54a and be representative of a high level of fluid, above which fluid should be removed from fluid system 12. In one embodiment, the letters "F" or "FULL" may be included in the second marking 54b. The area between first and second markings 54a and 54b may be representative of an acceptable level of fluid within fluid system 12. Hatch marks may be included at markings 54 to provide a cohesive surface for the fluid (i.e., the hatch marks may hold fluid after dipstick 22 has been removed from guide tube 16, thereby allowing the fluid to stick to blade 30 and be observed by the service technician).

Industrial Applicability

The disclosed fluid level gauge may be applied to any machine where accurate fluid level readings without fluid or gas escape is important. The disclosed fluid level gauge may minimize fluid and gas escape by ensuring that a blade portion of the gauge transmits minimal torque to unseat an associated sealing portion. The operation of the disclosed fluid level gauge will now be described.

When machine 10 is non-operational, a service technician may turn handle 26 in a counterclockwise manner through an angle of about 90 degrees, thereby releasing handle 26 from adapter 24. The technician may then draw dipstick 22 from adapter 24 until blade 30 clears guide tube 16. After wiping substantially all fluid from blade 30, dipstick 22 may be returned to guide tube 16, and the removal process repeated such that a clean fluid reading may be taken. If the fluid on markings 54 of blade 30 is at a level below the "L", the technician may introduce additional fluid into fluid system 12 until the fluid level is between the "L" and the "F". After reading the fluid level and responsively adding additional fluid, the technician may return dipstick 22 to guide tube 16 until flange portion 34 is again seated against an end of adapter 24. To ensure accuracy, the process may be repeated after the addition of any fluid.

Because handle 26 may be rotated independent of blade 30 (i.e., because handle 26 may only transmit minimal torque to blade 30 and vice versa), the likelihood of fluid and/or gases exiting machine 10 via fluid level gauge 14 may also be minimal. That is, regardless of any binding that might occur along a length of blade 30, handle 26 may not transmit and/or store torque within blade 30. As a result, torque can not be transmitted in reverse direction after handle 26 has been released by the service technician.

Further, because handle 26 is connected to swivel 28 by way of a c-clip, and because swivel 28 is connected to blade 30 by way of a rivet 48, fluid level gauge 14 may be robust. That is, the likelihood of damage to the connecting components of fluid level gauge 14 caused by bending may be negligent. And, the likelihood of rivet 48 becoming dislodged from swivel 28 may be minimal.

It will be apparent to those skilled in the art that various modifications and variations can be made to the disclosed fluid level gauge. Other embodiments will be apparent to those skilled in the art from consideration of the specification and practice of the disclosed fluid level gauge. It is intended that the specification and examples be considered as exemplary only, with a true scope being indicated by the following claims and their equivalents.

What is claimed is:

1. A fluid level gauge, comprising:
   a blade;
   a handle having a protrusion;
   a swivel rigidly connected to the blade and having a recess to receive the protrusion; and a retention member configured to inhibit the protrusion from exiting the recess, wherein the swivel can rotate independent of the handle when the fluid level gauge is fully assembled.

2. The fluid level gauge of claim 1, wherein the retention member is a C-clip configured to engage a groove in the protrusion.

3. The fluid level gauge of claim 2, wherein the swivel includes an opening to allow connection of the C-clip with the protrusion.

4. The fluid level gauge of claim 1, wherein the retention member is a first retention member and the fluid level gauge further includes a second retention member configured to rigidly connect the blade to the swivel.

5. The fluid level gauge of claim 4, wherein the second retention member is a cylindrical retention member.

6. The fluid level gauge of claim 5, wherein the cylindrical retention member is a rivet.

7. The fluid level gauge of claim 6, wherein the swivel has two opposing generally planar sides configured to support opposing ends of the rivet.

8. The fluid level gauge of claim 1, further including a guide tube configured to receive the blade.

9. The fluid level gauge of claim 8, wherein the guide tube includes at least one bend.

10. The fluid level gauge of claim 8, further including an adapter connected to the guide tube and configure to receive the swivel and at least a portion of the handle.

11. The fluid level gauge of claim 10, further including a sealing member connected to the handle to fluidly seal the handle to the adapter.

12. The fluid level gauge of claim 10, wherein the adapter is molded onto the guide tube.

13. The fluid level gauge of claim 10, wherein the handle includes at least one feature configured to pilot the handle into the adapter.

14. The fluid level gauge of claim 10 wherein the swivel includes at least one feature configured to pilot the swivel into the adapter.

15. The fluid level gauge of claim 10, wherein the adapter includes a protrusion configured engage a threaded portion of the handle.

16. The fluid level gauge of claim 15, wherein the threaded portion allows for a quarter turn full engagement of the handle with the adapter.

17. An engine, comprising:
an engine block;
an oil sump connected to collect oil from the engine block; and
an oil level gauge configured to provide an indication of an amount of oil in the oil sump, the oil level gauge including:
a guide tube extending into the oil sump;
a blade removably disposed within the guide tube;
a handle having a protrusion;
a swivel rigidly connected to the blade and having a recess to rotationally receive the protrusion;
a C-clip configured to engage an annular recess located on the protrusion to prevent the protrusion from exiting the recess; and
a rivet configured to connect the blade to the swivel.

\* \* \* \* \*